United States Patent [19]
Smoot

[11] 3,737,972
[45] June 12, 1973

[54] METHOD OF MOUNTING PLASTIC TRIM STRIP
[75] Inventor: Edward H. Smoot, Holcomb, N.Y.
[73] Assignee: The Schlegal Manufacturing Company, Rochester, N.Y.
[22] Filed: June 21, 1971
[21] Appl. No.: 154,738

[52] U.S. Cl. .............. 29/453, 29/526, 49/492, 52/717, 293/DIG. 4
[51] Int. Cl. ............................................ B23p 11/02
[58] Field of Search .............. 29/453, 526; 49/492; 52/717; 293/62, 1, DIG. 4

[56] References Cited
UNITED STATES PATENTS

| | | | |
|---|---|---|---|
| 1,195,218 | 8/1916 | Hazelworth | 52/717 |
| 1,285,688 | 11/1918 | Hamilton | 52/717 |
| 1,353,885 | 9/1920 | Aufderheide | 52/717 |
| 2,287,606 | 6/1942 | Eady | 293/DIG. 4 UX |
| 2,638,642 | 5/1953 | Sprarogen | 49/492 |
| 2,972,789 | 2/1961 | Mathues | 49/492 |

FOREIGN PATENTS OR APPLICATIONS

| | | | |
|---|---|---|---|
| 855,552 | 5/1940 | France | 49/492 |

Primary Examiner—Charlie T. Moon
Attorney—George W. Shaw and Eugene S. Stephens

[57] ABSTRACT

A mechanical, spring clip mounting method for plastic trim strips allows plastic to be substituted for metal in trimming automobiles. A base lamina of plastic is formed and punched with holes through which spring clips are inserted, and trim lamina is secured to the base lamina to cover the spring clips which are pressed into holes to fasten the trim strip in place.

6 Claims, 3 Drawing Figures

PATENTED JUN 12 1973 3,737,972

INVENTOR.
EDWARD H. SMOOT

BY Cumpston, Shaw
& Stephens
ATTORNEYS

METHOD OF MOUNTING PLASTIC TRIM STRIP

THE INVENTIVE IMPROVEMENT

Metal trim strips for automobiles are becoming less desirable, because they are safety hazards when they come loose in a collision, they are relatively expensive, and they are subject to corrosion. Plastic materials have been developed to form attractive trim strips, and they would replace metal trim strips, except for problems of mounting them securely in place. The traditional ways of fastening on plastic parts are to use adhesives, heat sealing or fusion between plastic materials, or chemical or solvent bonds formed between plastic materials. For various reasons, all of these present problems in the automotive industry, and to overcome these problems, the industry has steadfastly sought better adhesives, better chemical bonds, and different plastic materials that would meet all the requirements for secure fusion or other bonding mount.

The invention departs from the usual ways of attempting to secure plastic strips in place and recognizes a way of adapting known spring clip mounting concepts to plastic materials to mount plastic trim strips mechanically in place. The invention thus applies mechanical mounting concepts to materials that have not been considered by others as suitable for such mounting. Also, the invention includes a method of arranging and securing spring clips in plastic trim strips so that mechanical mounting is simple, convenient, and efficient.

SUMMARY OF THE INVENTION

By the inventive method, a base lamina is formed of plastic material, and holes are punched in predetermined places in the base lamina. Then spring clips are inserted through the holes to extend beyond the inward facing side of the base lamina. A trim lamina is formed for a trim strip and is secured to the base lamina to overlie the outward facing side of the base lamina and cover the heads of the spring clips and secure them in place in the trim strip. Holes are formed in the automobile mounting surface in registry with the spring clips, and the spring clips are pressed into the mounting holes to fasten the trim strip in place.

DRAWINGS

DETAILED DESCRIPTION

Figure 1:
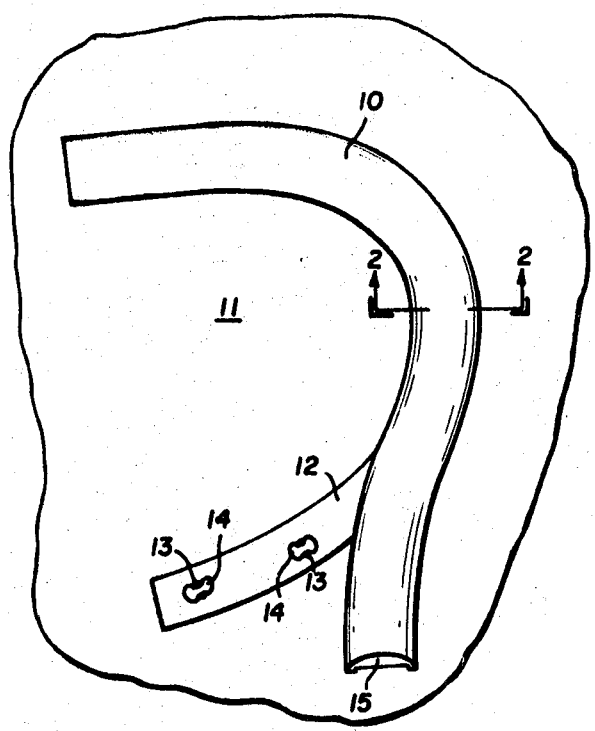
FIG. 1 is a perspective view of a trim strip mounted in place according to the invention.
Figure 2:
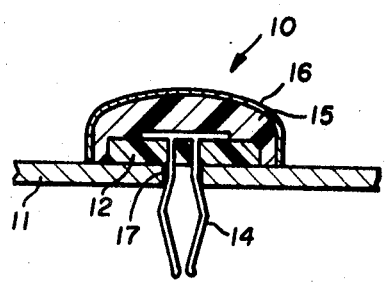
FIG. 2 is a cross section of the trim strip mounting of FIG. 1 taken along the line 2 — 2 thereof.

FIGS. 1 and 2 show a trim strip 10 secured in place on an automobile mounting surface 11 according to the invention. The laminae of strip 10 are partially separated in FIG. 1 for a better view. A base lamina 12 for trim strip 10 is formed of plastic material to establish the desired shape for trim strip 10. For straight or slightly curving trim strips, base lamina 12 is preferably a straight extrusion of flexible plastic material, but for the curved shape illustrated in FIG. 1, base lamina 12 is preferably die-cut from relatively rigid plastic material to retain the illustrated shape. Holes 13 are punched in base lamina 12, preferably in the die-cutting operation, or subsequent to extrusion if base lamina 12 is formed as a linear strip. Holes 13 are preferably rectangular in shape to establish the desired orientation of spring clips, and holes 13 are spaced at predetermined locations along base lamina 12.

Spring clips 14 are then inserted through holes 13 so that their spring legs extend beyond the inward facing side of base lamina 12 as best shown in FIG. 2. Spring clips 14 can be metal or plastic, and are preferably fitted to holes 13. Spring clips 14 can be rounded for fitting round holes in any orientation, or can be squared or rectangular for fitting the preferably rectangular holes 13 to be held in a desired orientation.

Trim lamina 15 is formed of plastic material and preferably made as an extrusion of relatively flexible plastic material to be fitted over base lamina 12. Trim lamina 15 can have any cross-sectional shape desired for attractive appearance, and is dimensioned to overlie base lamina 12. Trim lamina 15 is preferably fused or otherwise secured to base lamina 12 to cover the heads of spring clips 14. This holds spring clips 14 securely in place and forms a flexible and durable plastic laminate for trim strip purposes.

A plastic finish strip 16 is secured over trim lamina 15 preferably by fusion or other means to give trim strip 10 the desired appearance such as a shiny chrome or metallic appearance. Finish strip 16 is not necessary if trim lamina 15 can have the desired surface.

Holes 17 are formed in mounting surface 11 to register with spring clips 14 in pre-determined locations, and then the spring clips 14 of the finished trim strip 10 are pressed into holes 17 to mount trim strip 10 securely in place on surface 11. The secure anchorage of spring clips 14 between laminas 12 and 15 ensures that trim strip 10 stays securely in place on surface 11. Such spring clip mounting also eliminates problems of thermo fusion or chemical bonding and avoids many difficult problems of assembly and environment requirements for the automobile.

Figure 3:
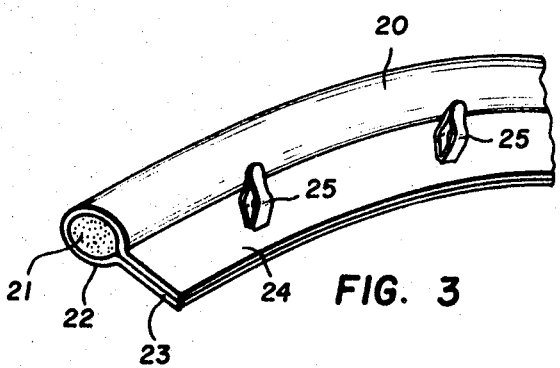
FIG. 3 is a perspective view of an alternative trim strip mounting.

The inventive mounting method is applied to a windlace 20 as shown in FIG. 3. A generally cylindrical, flexible, foamed plastic core 21 forms the body of windlace 20 and a flexible plastic sheath 22 is wrapped around core 21 to cover and finish windlace 20. The edges of sheath 22 extend outward from core 21 in flanges 23 and 24 that are used for mounting windlace 20. Flange 24 is formed as a abase lamina in which holes are punched at spaced locations. Then spring clips 25 are inserted through holes in flange 24 to extend outward for mechanically fastening windlace 20 in place. Then trim flange 23 is fused to flange 24 to overlie the heads of spring clips 25 and secure them in place. Spring clips 25 are then pressed into holes in the automobile body to mount windlace 20 around doors and windows. Flanges 23 and 24 then serve respectively as a trim lamina and a base lamina for mounting windlace 20 in place.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the various shapes, sizes, materials, and appearances that can be made of plastic laminates with spring clips secured between the laminates for mechanical mounting of trim strips in place.

I claim:

1. A method of mounting a plastic trim strip on a metal or plastic mounting surface of an automobile, said method comprising:
   a. forming a base lamina of plastic material;
   b. punching holes in pre-determined places in said base lamina;
   c. inserting spring clips through said holes to extend beyond the inward facing side of said base lamina;
   d. forming a trim lamina for said trip strip;
   e. fusing a plastic finish strip over the outer surface of said trim lamina;
   f. securing said trim lamina to said base lamina to overlie the outward facing side of said base lamina to cover the heads of said spring clips and secure said spring clips in place;
   g. forming holes in said automobile mounting surface in registry with said spring clips; and
   h. pressing said spring clips into said holes in said mounting surface to fasten said trim strip in place.

2. The method of claim 1 including die-cutting said base lamina of a relatively rigid plastic material, and punching holes in said base lamina in said die-cutting operation.

3. The method of claim 2 including forming said trim lamina of an extrusion of relatively flexible plastic material.

4. The method of claim 1 including extruding said base lamina of plastic material.

5. The method of claim 1 including making said punched holes in said base lamina rectangular in shape to orient said clips.

6. The method of claim 1 including fusing said trim lamina to said base lamina.

* * * * *